United States Patent
Yin

(10) Patent No.: US 7,197,666 B1
(45) Date of Patent: Mar. 27, 2007

(54) METHOD FOR CHECKING THE RESET FUNCTION IN AN EMBEDDED PROCESSOR

(75) Inventor: Robert Yin, Castro Valley, CA (US)

(73) Assignee: Xilinx, Inc., San Jose, CA (US)

( * ) Notice: Subject to any disclaimer, the term of this patent is extended or adjusted under 35 U.S.C. 154(b) by 615 days.

(21) Appl. No.: 10/393,550

(22) Filed: Mar. 21, 2003

(51) Int. Cl.
*G06F 11/00* (2006.01)

(52) U.S. Cl. ............................. 714/23; 714/10; 714/55

(58) Field of Classification Search ................. 714/10, 714/23, 55; 713/1
See application file for complete search history.

(56) References Cited

U.S. PATENT DOCUMENTS

| 6,014,758 A * | 1/2000 | Poisner ........................ 714/36 |
| 6,438,709 B2 * | 8/2002 | Poisner ........................ 714/23 |

FOREIGN PATENT DOCUMENTS

EP        1094382 A1 *   4/2001

OTHER PUBLICATIONS

"Register" "FPGA" Microsoft Computer Dicitonary (c) 2002. Microsoft Press.*
IBM, "PowerPC Embedded Processors Apllication Note"; "PowerPC 40x Watch Dog Timer"; Jul. 7, 1998, Version 1.0; IBM Microelectronics Research Triangle Park; downloaded from http://www-3.ibm.com/chips/techlib/techlib.nsf/products/PowerPC_405CR_Embedded_Processor; pp. 1-13.

* cited by examiner

*Primary Examiner*—Robert Beausoliel
*Assistant Examiner*—Matthew Urick
(74) *Attorney, Agent, or Firm*—Peter Hernandez; Robert Brush

(57) ABSTRACT

A method for checking the reset function of an embedded processor is described. First, a check is made to see if a reset "flag" is not set (202) before branching to execute the test routine that initiates the embedded processor's reset (206). The test program sets the flag (204) before initiating the reset. When the processor resets and executes the test program from the beginning again, it determines that the flag was set (202), and it does not execute the reset instructions again.

20 Claims, 2 Drawing Sheets

METHOD FOR CHECKING THE RESET FUNCTION IN AN EMBEDDED PROCESSOR

FIELD OF THE INVENTION

This invention relates in general to the field of electronics and more specifically, to a method for checking the reset function in a processor.

BACKGROUND OF THE INVENTION

In electronic circuits that use processor(s) such as general purpose microprocessors, digital signal processors, and the like, embedded in an Integrated Circuit (the embedded processor(s) also hereinafter referred to as embedded processor(s)), a few of the functions that need to be tested are the reset function of the embedded processor(s), as well as the initial power up reset of the entire electronic circuit. The embedded processor(s) reset function needs to be tested while the processor is actively executing a program, such as a test program, in order to fully test the operation of the reset function.

The functionality of the embedded processor(s) needs to be verified to ensure that the embedded processor core(s) functions as specified when operated in the Integrated Circuit, for example, a Field Programmable Gate Array (FPGA). Processor functionality is typically verified using test programs running on the processor(s). When the FPGA is powered up, the embedded processor core is placed in a reset mode by the test program while the FPGA is configured. Once the FPGA configuration is completed, the power up reset signal to the processor is de-asserted and the embedded processor starts fetching instructions from a test program that is loaded onto the processor and commences executing the instructions to verify various processor functions.

A typical processor will have a feature such as a Watch Dog Timer (WDT) that can be programmed so that the processor can be reset when the WDT times out. The problem with this approach in an embedded system environment is that after the test program resets the embedded processor, the test program reboots and starts executing again from the beginning. Thus, a need exists in the art for a way to prevent an embedded processor from executing a test program in an infinite reset loop and for a test program to verify in a self-checking fashion that it indeed resets the embedded processor.

SUMMARY OF THE INVENTION

In accordance with one aspect of the present invention, a method for testing the reset function of an embedded processor includes the step of determining the status of a memory location to determine if an attempt to reset the embedded processor has already occurred. If it is determined that a reset has not been attempted, a flag is set in the memory location, and a reset of the embedded processor is then attempted. Once the embedded processor is reset, the memory location is checked again, and if the flag is set, the test routine checks the status of the reset that was performed.

In another aspect of the invention, the status of the embedded processor reset is determined by checking a register that is part of a Watch Dog Timer circuit that is located in the embedded processor. In still another aspect of the invention, the embedded processor is part of a Field Programmable Gate Array (FPGA).

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
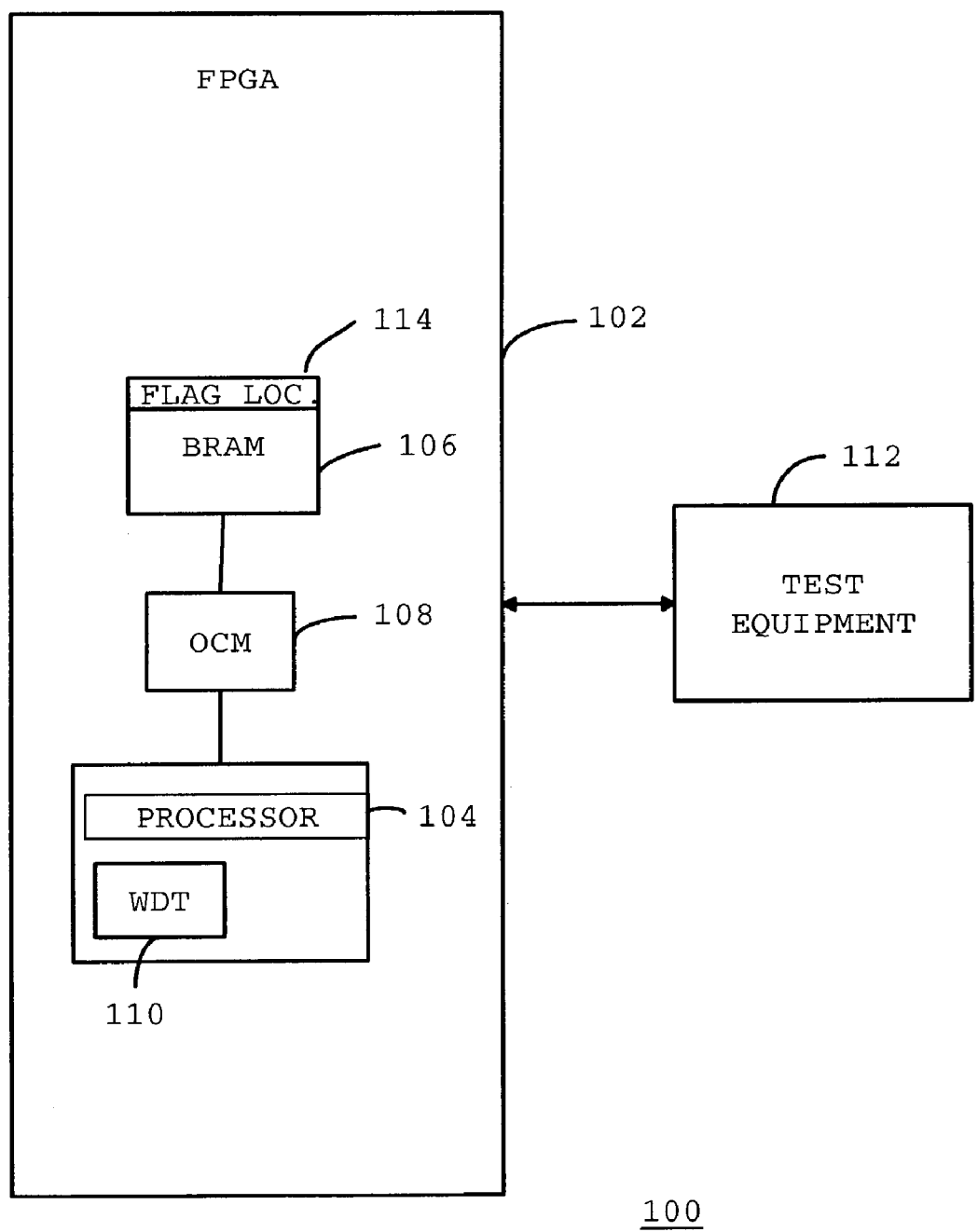
FIG. 1 shows a diagram of an electronic circuit having an embedded processor that is under test in accordance with the invention.

While the specification concludes with claims defining the features of the invention that are regarded as novel, it is believed that the invention will be better understood from a consideration of the following description in conjunction with the drawing figures.

Referring now to the drawings and in particular to FIG. 1, there is shown an electronic circuit 100 having an embedded processor. In the preferred embodiment, the electronic circuit 100 comprises an FPGA 102 having an embedded (core) processor 104. The core processor 104 can be a microprocessor, a digital signal processor (DSP) or other type of processor that can be reset. In the preferred embodiment, the core processor comprises an International Business Machine (IBM) PowerPC™ 405 RISC CPU core, and the FPGA 102 comprises a Virtex-II Pro™ Field Programmable Gate Array (FPGA) manufactured by Xilinx, Incorporated that incorporates the present invention. The core processor block 104 includes not only the Central Processing Unit (CPU) but also the necessary interface logic and the CPU-to-FPGA interface circuitry.

Connected to the core processor 104 via an on-chip memory (OCM) controller 108 is a memory such as block random access memory (BRAM) 106. The OCM controller 108 serves as a dedicated interface between the BRAM 106 in the FPGA fabric and the OCM signals available on the embedded processor 104. Test equipment 112 that is connected to FPGA 102 loads a test program onto core processor 104 that tests among other things the core processor's reset functionality.

In order to overcome the problems previously mentioned, the test program that is loaded onto the core processor 104 first checks to see if a reset "flag" loaded in a memory location 114, such as in BRAM 106, is not set before branching off to execute the test routine that initiates the reset of the core processor 104. Preferably, this test routine uses a WDT 110 found in the core processor 104. In the reset routine, the test program sets the flag before initiating the reset of the embedded processor 104.

When the processor 104 resets and executes the test program from the beginning again, it will check the status of the memory location 114 to determine if the flag is set, and if set, instead of branching to execute the reset instructions again, it will execute another set of test instructions that check for the occurrence of the reset. If the reset occurred as expected, then the test program signals that the test succeeded and stops, if the reset did not occur, the test program signals that the test failed and stops.

The test program sets the flag at a storage location such that any processor reset will not erase it. Also, the location of the flag should not be affected by the processor's reboot software routine. Depending on the processor implementation, reset type, and software boot routine in use, a processor reset can either reset or not reset registers in the processor such as the general purpose registers (GPRs). Given all this, using a register in the processor itself to store the flag is conditional and uncertain.

Since the processor 104 used in preferred embodiment has a Data-Side On-Chip Memory (DSCOM) interface that provides access to on-chip memory located in the FPGA 102, these on-chip memories, such as BRAM 106, are not affected by any of the embedded processor resets. Therefore, in the preferred embodiment, the flag used in the present invention is stored in an address location 114 of BRAM 106. The test program sets the flag by writing a predetermined value to the address location 114.

Figure 2:
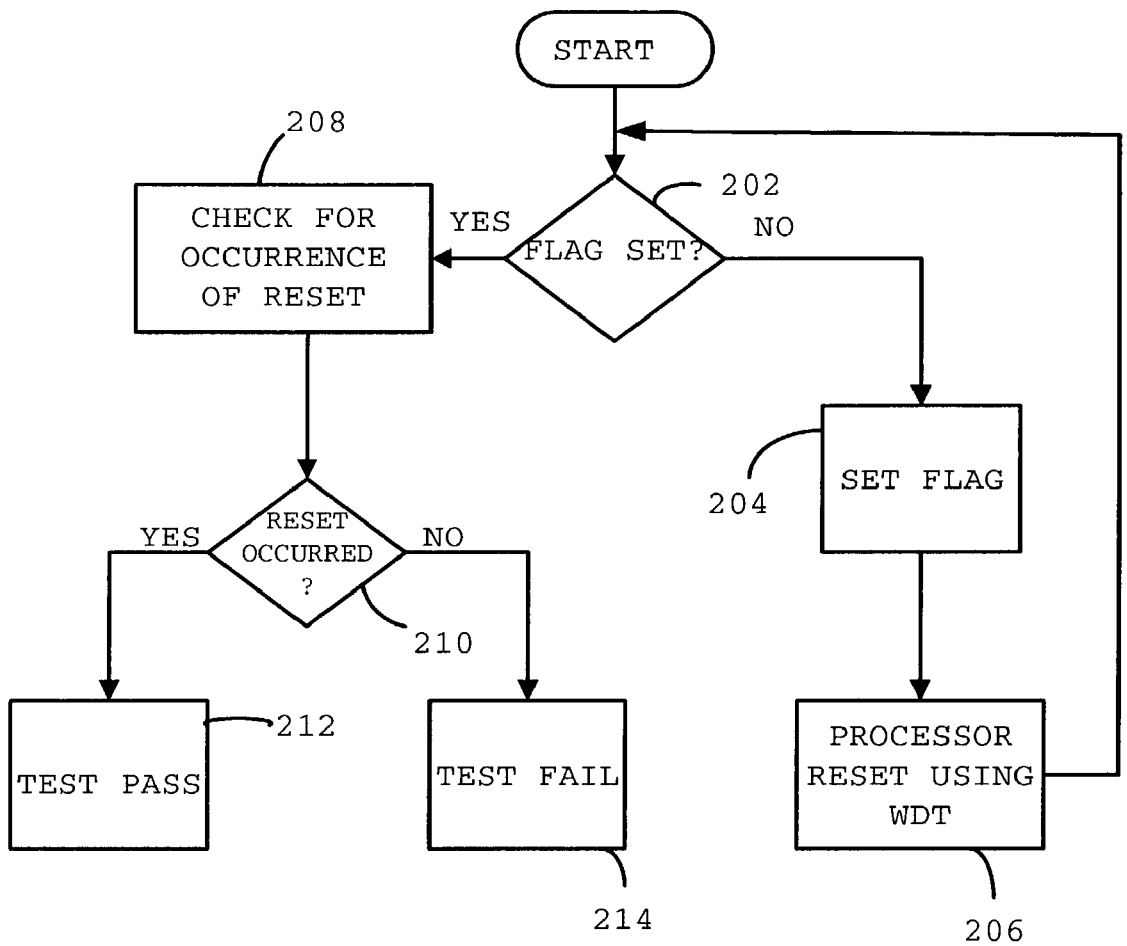
FIG. 2 shows a flow chart highlighting the steps taken in accordance with the preferred embodiment of the invention.

In FIG. 2, there is shown a flowchart illustrating the steps taken in order to test the reset function in the embedded processor. In step 202, the routine first determines if the reset flag has been set. If it has not been set, in step 204, as part of the embedded processor's reset test routine that was loaded into processor 104 by test equipment 112, the reset flag is set.

In step 206, the WDT is set-up and the processor reset using the WDT is performed. In this step, the WDT 110 found in the embedded processor 104 is first properly set up to conduct the reset function. Since the embedded processor 104 in the preferred embodiment comprises an IBM PowerPC™ 405 RISC CPU core, which has a WDT that is controlled by two registers, the Timer Control Register (TCR) and the Timer Status Register (TSR), both of these registers are properly setup (e.g., registers properly initialized, etc.) to conduct the reset.

The WDT has its count(s) properly initialized in this particular design; three wait loops are used since the WDT needs three WDT events to trigger a reset. A complete discussion of the WDT used in the preferred embodiment, can be found in a publication entitled PowerPC 40X Watch Dog Timer, Version 1.0, dated Jul. 7, 1998 by IBM Microelectronics Research Triangle Park, which is hereby incorporated by reference. Although a WDT is used in the preferred embodiment to cause the processor reset condition, the present invention is not limited in using a WDT, but can be incorporated into other embedded processors were the reset of the processor is performed by other circuitry.

If properly functioning, the WDT 110 will reset the core processor 104, causing the core processor 104 to reboot and start executing the test program that had been loaded into the processor back to step 202. In step 202, the processor 104 again checks the flag address 114 to see if it is set. If the reset flag has been set, indicating that the reset of the processor has already been attempted before by the test program, the routine moves to step 208.

In step 208, the occurrence of the reset of processor is determined, by checking the TSR that is located inside of the processor 104. The TSR includes a Watchdog Reset Status (WRS) field that indicates the type of reset the processor 104 had. The WRS field indicates the type of reset as follows:

00=no watchdog reset has occurred
01=core reset was forced by the watchdog
10=chip reset was forced by the watchdog
11=system reset was forced by the watchdog.

Although the present invention is concerned with the core reset, the present invention can be used for all three types of resets shown above.

In step 210, it is determined if the core reset was forced by the WDT, if it was, then the routine moves to step 212, were the test program signals a test pass. If in step 210, it is determined by checking the WRS field of the TSR, that the core processor did not properly reset, the routine moves to step 214, where the test program signals a failed test condition. Depending on the particular design, after the test pass 212 or test fail 214, the test program may continue testing other functions of the processor, or stop the processor testing altogether.

Below there is shown a sample simulation test program routine that illustrates the reset implementation used in one embodiment of the invention. Comments have been interspersed in the code to explain the code functionality.

```
...                                   !initialization routine
    !set up value to check for flag set or not set
    addis    r9, 0, 0x12a1       !r9 <- 0X12a1_b278-special
    ori      r9, r9, 0xb278      !value represents flag
    lwz      r10, 32(r26)        !read from on-chip memory BRAM
                                 !get flag value
    cmp      r10, r9             !check for flag
    bne      goReset             !if flag is not set, go to
                                 !reset routine
    nop
!after SW reset
    !read Timer Status Register (TSR) to check type of reset
    addis    r14, 0, 0xf000      !set up mask to get TSR[WRS]
    ori      r14,r14, 0x0000     !
    addis    r15, 0, 0xd000      !set up compare value for
    ori      r15, r15,0x0000     !core reset
    mftsr    r11                 !read TSR
    and      r11, r11, r14       !get TSR[0:3] value
    cmp      r11, r15            !check expected reset type
    bne      TEST_ERROR          !Processor core is not reset
                                 !correctly
    nop
    b        TEST_SUCCESS        !Processor core reset correctly
!reset routine- test program resets the processor core
goReset:
    !set the flag - by writing special value to BRAM
    sth      r16, 33(r26)        !#32 <- 0x12a1_b278
!code to reset Processor
    !set up Timer Status Register
    addis    r1, 0, 0xffff       !clear all bits
    ori      r1, r1, 0Xffff
    mttsr    r1
    !set up Timer Control Register
    addis    r1, 0, 0x1000       !set up for core reset
    ori      r1, r1, 0x0000
    mttcr    r1
    !initialize count for 1st WDT timeout
    li       r21, 0              !initialize count
    li       r22, 32             !max count
    !initialize count for 2nd WDT timeout
    li       r23, 0              !initialize count
    !initialize count for 3rd WDT timeout
    li       r24, 0              !initialize count
!code that waits for WDT timeout
    !short cut the count
    addis    r7, 0, 0x0000       !80 cycles to go before
    ori      r7, r7, 0xffa0      !WDT timeout
    mttb     r7
loop1:
    addi r21, r21, 1             !wait for 1st WDT timeout
    cmp      r21 r21,
    bne      loop1
    nop
    mttb     r7                  !short cut the count
loop2:
    addi     r23, r23, 1         !wait for 2nd WDT timeout
    cmp      r23, r22
    bne      loop2               !processor resets after 2nd
                                 timeout
    nop
    mttb     r7                  !short cut the count
loop3:
    addi     r24, r24, 1         !wait processor to reset
    cmp      r24, r22
```

-continued

```
        bne     loop3
        nop
!test program signals pass or fail for self-checking
TEST_ERROR:
        li      r3, 1
        blr
TEST_SUCCESS:
        li      r3, 0
        blr
        EPILOG (main)
!DSCOM address locations initialized for this test
        .section ocm_data, data
ocm_data1:                      !1st 1K byte page address
        .long   0xa1b1c1d1      !+0 (decimal)
        .long   0x00101001      !+4
        .long   0x00202002      !+8
        .long   0x00303003      !+12
        .long   0x00404004      !+16
        .long   0x00505005      !+20
        .long   0x00606006      !+24
        .long   0x00707007      !+28
        .long   0x12345678      !+32
        .long   0x00909009      !+36
        .long   0x0100a010      !+40
        .long   0x0110b011      !+44
        .long   0x0120c012      !+48
        .long   0x0130d013      !+52
        .long   0x0140e014      !+56
        .long   0x0150f015      !+60
```

In the above routine, the 3 wait loops (loop1 to loop3) are cut short in order to save simulation time, however, in practice, the wait loops would be allowed to completely finish, before moving on. Also, as previously mentioned, the present invention cannot only be used for embedded processor resets, but also for chip and system level resets.

The present invention provides for an efficient way of preventing an embedded processor from executing a test program designed to test the processor's reset functionality in an infinite reset loop, by providing for a flag check prior to performing the processor reset routine.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, although in the preferred embodiment, a flag is set in step 202, instead of setting the flag, a flag could be cleared, prior to performing the processor-reset routine.

The invention claimed is:

1. A method for checking a reset function of an integrated circuit having a processor coupled to a memory, the method comprising the steps of:
   (a) determining the status of a flag located in a memory location of the memory, wherein the memory location is not erased by any reset of the processor;
   (b) setting the flag if the flag was determined not to be set; and
   (c) performing a reset of the processor if in step (b) the flag was set.

2. A method as defined in claim 1, wherein step (c) is performed by a Watch Dog Timer (WDT) located in the processor.

3. A method as defined in claim 1, wherein steps (a) to (c) are performed using a test program that is loaded into the processor.

4. A method as defined in claim 1, further comprising the steps of:
   (d) determining the status of the flag after step (c) has been performed; and
   (e) checking for the occurrence of the reset.

5. A method as defined in claim 4, wherein step (e) is performed only if in step (a) it is determined that the flag has been set.

6. A method as defined in claim 2, wherein the checking for the occurrence of the reset in step (e) comprises the step of:
   (e1) checking the status of a register within the processor.

7. A method as defined in claim 4, wherein the register of step (e1) is located within a Watch Dog Timer (WDT) found in the processor, and the status of the register signals if the processor was properly reset or not.

8. A method as defined in claim 4, wherein the processor is embedded within a Field Programmable Gate Array (FPGA).

9. A method as defined in claim 8, wherein the memory location is located external to the processor.

10. A method of testing an embedded processor core located within a Field Programmable Gate Array (FPGA) by a test program loaded into the embedded processor core, the method comprising:
    (a) checking the status of a memory location to determine if the embedded processor core has been previously reset, wherein the memory location is not erased by any reset of the processor;
    (b) setting a flag in the memory location if is determined that a reset has not been previously performed; and
    (c) performing a reset of the embedded processor core if in step (b) the flag is set.

11. A method as defined in claim 10, wherein step (c) is performed using a Watch Dog Timer (WDT) located in the embedded processor.

12. A method as defined in claim 11, further comprising the step of:
    (d) determining the status of the reset performed in step (c) by checking a register located in the Watch Dog Timer.

13. A method as defined in step 12, wherein if in step (d) it is determined that the embedded processor was properly reset, the test program signals a test pass condition, and if in step (d) it is determined that the embedded processor was not properly reset, the test program signals a test fail condition.

14. A method as defined in claim 10, further comprising the steps of:
    (d) performing step (a) again after step (c) is performed; and
    (e) checking the occurrence of the reset performed in step (c) if it is determined in step (d) that the status of the memory location indicates that an attempt to reset the embedded processor core had been previously attempted.

15. A method as defined in claim 14, wherein the memory location is not erasable by a reset of the embedded processor core.

16. A method of testing a reset functionality of an embedded processor located within an electronic circuit, comprising the steps of:

(a) checking a memory to determine if an attempt has already been made to reset the embedded processor, wherein the memory is not erased by any reset of the processor; and (b) attempting to reset the embedded processor only if in step (a) it is determined that a reset of the embedded processor was not previously attempted.

17. A method as defined in claim 16, wherein a flag is loaded into the memory prior to performing step (b) the flag signifying that a reset of the embedded processor has been attempted.

18. A method as defined in claim 17, wherein the memory is located in the electronic circuit in a location where it is not affected by the resetting of the embedded processor.

19. A method as defined in claim 17, wherein the flag is loaded into the memory by a test program that is being executed by the embedded processor.

20. A method as defined in claim 17, wherein if in step (b) it is determined that a reset of the embedded processor has already occurred, the following step is performed:

(c) checking the status of a register located in the embedded processor to determine if the reset was successful or not.

* * * * *